United States Patent [19]
Sakai et al.

[11] Patent Number: 6,040,693
[45] Date of Patent: Mar. 21, 2000

[54] USER INITIATED MAGNETIC HEAD WEAR MEASURING AND DISPLAY SYSTEM

[75] Inventors: Seiichi Sakai, Tokyo; Teruyuki Yoshida; Fumiyoshi Abe, both of Kanagawa, all of Japan

[73] Assignee: Sony Corporation, Tokyo, Japan

[21] Appl. No.: 08/879,793

[22] Filed: Jun. 20, 1997

[30] Foreign Application Priority Data

Jun. 27, 1996 [JP] Japan ................................ 8-167516

[51] Int. Cl.⁷ ............................ G11B 5/00; G01R 33/12; G01N 27/72
[52] U.S. Cl. ............................ 324/210; 360/137
[58] Field of Search .................. 324/210, 211, 324/212, 226, 234, 236, 262; 360/31, 84, 110, 119, 137

[56] References Cited

U.S. PATENT DOCUMENTS 4,831,362  5/1989  Tsaprazis ........................... 324/202
5,729,133  3/1998  Sakai et al. ....................... 324/210

*Primary Examiner*—Walter E. Snow
*Attorney, Agent, or Firm*—Jay H. Maioli

[57] ABSTRACT

A magnetic recording and reproducing apparatus in which a magnetic head contacts a recording medium to record or reproduce a signal onto or from the recording medium. The apparatus includes a measurement unit for measuring an abrasion amount of the magnetic head and outputting measurement data. A display unit displays the abrasion amount of the magnetic head represented by the measurement data outputted from the measurement unit.

14 Claims, 4 Drawing Sheets

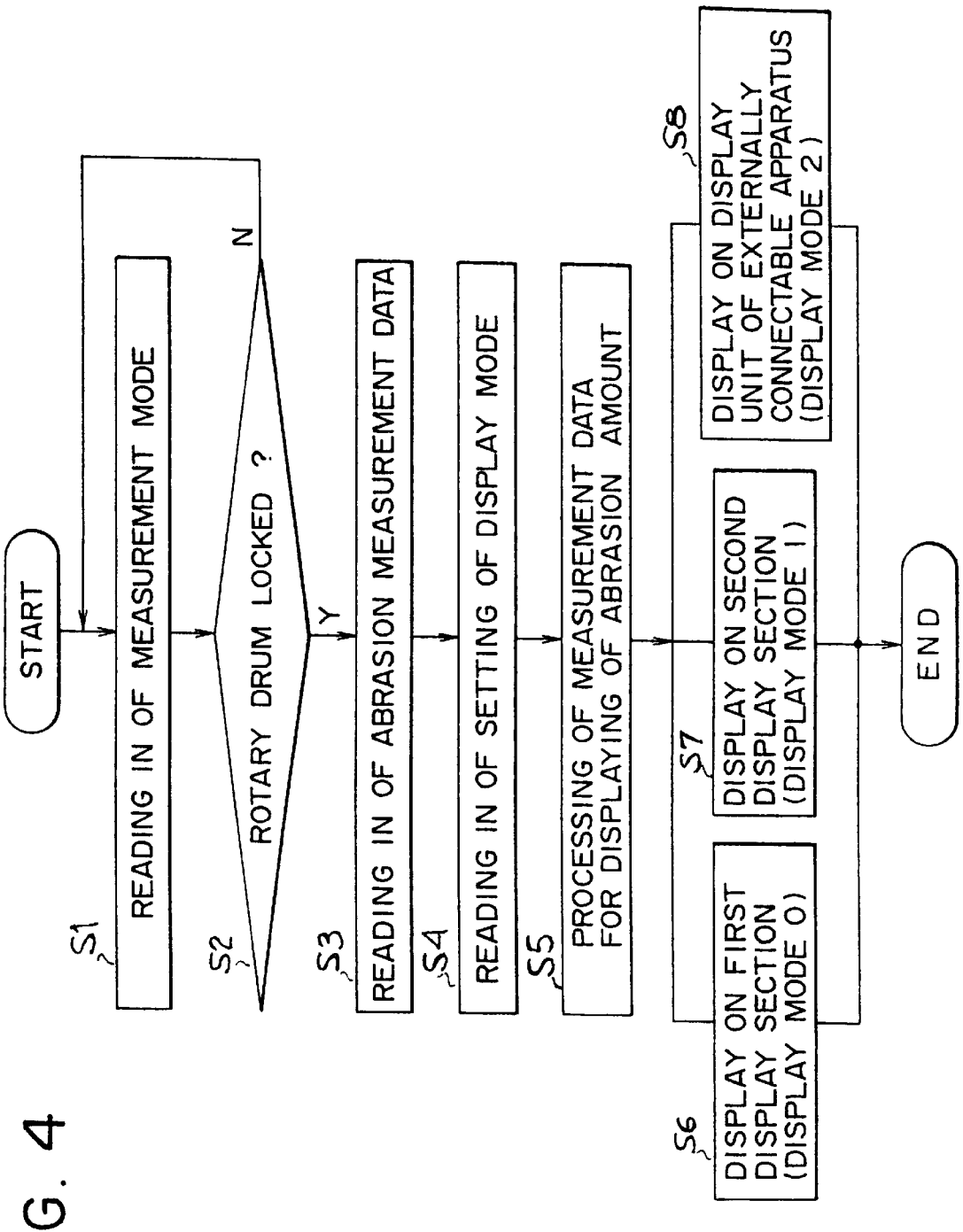

USER INITIATED MAGNETIC HEAD WEAR MEASURING AND DISPLAY SYSTEM

BACKGROUND OF THE INVENTION

This invention relates to a magnetic recording and reproducing apparatus, and more particularly to a magnetic recording and reproducing apparatus which includes a magnetic head abrasion amount measuring instrument employing a magnetic sensor or a like element.

A magnetic head incorporated in a magnetic recording and reproducing apparatus is abraded as the time of use thereof proceeds because it contacts with a magnetic tape as a recording medium when it records and/or reproduces a signal. Particularly, where the magnetic head is of the rotary head type wherein it is mounted on a rotary drum, the magnetic head is abraded comparatively rapidly. The life of the rotary type magnetic head is rather short since the relative speed between the rotary type magnetic head and a magnetic tape used as a recording medium is higher than that of a stationary type magnetic head. As abrasion of a magnetic head proceeds, a region in which a magnetic head gap is formed, that is, a head depth, decreases, and the contacting characteristic with a magnetic tape and the electromagnetic conversion characteristic (frequency characteristics upon recording and reproduction) of the magnetic head vary significantly. Although it is possible to estimate these variations to some degree, since the amount of abrasive included in a tape is different depending upon the type of tape, if tapes of different types are used, it is difficult to accurately estimate the useful lifetime of the magnetic head. Therefore, in order to guarantee a magnetic reproduction characteristic of a magnetic recording and reproducing apparatus, the degree of abrasion of the magnetic head must be measured periodically to confirm that the degree of abrasion remains within an allowable range. For such measurement, an expensive jig for exclusive use has been prepared as a magnetic head abrasion measuring instrument. A operation is performed to open a housing of the magnetic recording and reproducing apparatus and set the jig in position relative to the rotary drum. However, such an operation requires much cost and time.

In order to solve the problem just described, the following patent applications regarding several magnetic head abrasion amount measuring instruments for measuring an abrasion amount of a magnetic head have been filed in Japan by the assignee of the present invention.

Japanese Patent Application No. Heisei 8-235471 discloses a magnetic head abrasion amount measuring instrument which includes a magnetic sensor disposed in an opposing relationship to but in a non-contacting relationship with a rotary magnetic head apparatus on which a magnetic head is mounted. The magnetic sensor is used as part of an oscillation element of an oscillation circuit. Further, taking note of the fact that the reluctance of a magnetic circuit at a position at which the magnetic head is opposed to the magnetic sensor varies depending upon the projecting amount of the magnetic head from the surface of the drum, a variation of the reluctance is taken as a variation of the oscillation frequency to measure the abrasion amount of the magnetic head.

Japanese Patent Application No. Heisei 7-353569 discloses another magnetic head abrasion amount measuring instrument wherein two magnetic sensors are disposed in an opposing relationship to a magnetic head such that they have different gaps from the magnetic head. The magnetic sensors are connected as variable oscillation elements to variable oscillation circuits such that, when the gaps of them from the drum are equal, same oscillation frequencies are outputted from the variable frequency circuits. The abrasion amount of the magnetic head is measured based on a variation of a difference between the oscillation frequencies of the magnetic sensors. Since a reluctance variation is involved in measurement of the head abrasion amount, the projecting amount of the head and hence the head abrasion amount can be measured with a high degree of accuracy. Since the measurement is performed without contact between the magnetic head and the magnetic sensors, there is no possibility that the magnetic head to be measured is damaged. Since the head abrasion amount is estimated making use of the difference between the two oscillation frequencies, the result of measurement is not influenced by a tolerance in shape or an allowance in mounting of the magnetic head.

Japanese Patent Application No. Heisei 7-285249 discloses a further magnetic head abrasion amount measuring instrument wherein a magnetic sensor is disposed in an opposing relationship to a magnetic head and in a non-contacting relationship with a magnetic tape. The magnetic sensor is used as part of an oscillation element of an oscillation circuit. Further, taking note of the fact that the reluctance of a magnetic circuit at a rotational position at which the magnetic head is opposed to the magnetic sensor varies depending upon the projecting amount of the magnetic head from the surface of the drum, a variation of the reluctance is taken as a variation of the oscillation frequency to measure the abrasion amount of the magnetic head. Since a reluctance variation is involved in measurement of the head abrasion amount, the projecting amount of the head and hence the head abrasion amount can be measured with a high degree of accuracy. Since the measurement is performed without contact between the magnetic head and the magnetic sensors, there is no possibility that the magnetic head to be measured is damaged. A temperature compensation apparatus is provided for the variable oscillation circuit so that the head abrasion amount can be measured without being influenced by an ambient temperature.

In the magnetic head abrasion amount measuring instruments described above, a pair of magnetic sensors are disposed at positions opposing a magnetic head mounted on a rotary drum outside an angular range within which a magnetic head is wrapped around the magnetic head, and a variation of the gap between the magnetic head and each of the magnetic sensors which is caused by abrasion of the magnetic head is converted into a variation in frequency making use of a variation in reluctance.

However, the proposals described above merely measure the abrasion amount of a magnetic head and output a result of the measurement as digital data, but do not explicitly propose a concrete mode or timing of a magnetic recording and reproducing apparatus in or at which the abrasion amount of the magnetic head is to be measured or a concrete display apparatus for allowing a user to visually perceive an abraded state or an abrasion amount of the magnetic head. Accordingly, the user cannot recognize the abraded state or the abrasion amount of the magnetic head, and this may possibly result in error in recording or reproduction.

SUMMARY OF THE INVENTION

It is an object of the present invention to provide a magnetic recording and reproducing apparatus which displays an abraded state or an abrasion amount of a magnetic head so as to be visually recognized by a user to prevent an error in recording or reproduction.

In order to attain the object described above, according to an aspect of the present invention, there is provided a magnetic recording and reproducing apparatus in which a magnetic head contacts a recording medium to record or reproduce a signal onto or from the recording medium, including measurement means for measuring an abrasion amount of the magnetic head and outputting measurement data, and display means for displaying the abrasion amount of the magnetic head represented by the measurement data outputted from the measurement means.

The measurement means may include a magnetic sensor for detecting the abrasion amount of the magnetic head.

The display means may display the abrasion amount of the magnetic head in the form of a graph having a starting point which represents that the magnetic head is abraded little and an end point representative of a limit of use of the magnetic head.

Alternatively, the display means may display the abrasion amount of the magnetic head in the form of a numerical value.

The display means may include a liquid crystal display unit which selectively displays an operation state of the magnetic recording and reproducing apparatus and the abrasion amount of the magnetic head.

The display means may display the abrasion amount of the magnetic head by lighting or blinking of a plurality of light emitting diodes. In this instance, the plurality of light emitting diodes may be lit or blink normally when power supply to the magnetic recording and reproducing apparatus is available.

The display means may selectively display a mode wherein the abrasion amount of the magnetic is displayed by lighting or blinking of a plurality of light emitting diodes, another mode wherein the abrasion amount of the magnetic head is displayed in the form of a graph having a starting point which represents that the magnetic head is abraded little and an end point representative of a limit of use of the magnetic head, and a further mode wherein the abrasion amount of the magnetic head is displayed in the form of a numerical value.

The measurement means may periodically and automatically measure the abrasion amount of the magnetic head based on a time of use of the magnetic recording and reproducing apparatus.

The magnetic recording and reproducing apparatus may further include a button for causing the measurement means to execute measurement when an operator desires.

Preferably, the measurement means has two modes including a mode wherein the measurement means periodically and automatically measures the abrasion amount of the magnetic head based on a time of use of the magnetic recording and reproducing apparatus, and another mode wherein the measurement means measures the abrasion amount of the magnetic head in response to depression of a button provided on the magnetic recording and reproducing apparatus to cause the measurement means to execute measurement when an operator desires.

According to another aspect of the present invention, there is provided a magnetic recording and reproducing apparatus in which a magnetic head contacts a recording medium to record or reproduce a signal onto or from the recording medium, including measurement means for measuring an abrasion amount of the magnetic head and outputting measurement data, and a connection terminal for connecting an externally connectable apparatus to which the measurement data representative of the abrasion amount of the magnetic head outputted from the measurement means is outputted and which includes display means for displaying the abrasion amount of the magnetic head represented by the measurement data.

Preferably, the magnetic recording and reproducing apparatus further includes display means for displaying the abrasion amount of the magnetic head represented by the measurement data outputted from the measurement means.

The abrasion amount of the magnetic head represented by the measurement data may be displayed on the display means of the externally connectable apparatus in response to a control signal outputted from the externally connectable apparatus connected to the connection terminal. In this instance, the display means of the externally connectable apparatus and display means of the magnetic recording and reproducing apparatus may be selectively used in response to a control signal outputted from the externally connectable apparatus connected to the connection terminal.

Each of the magnetic recording and reproducing apparatus according to the two aspects of the present invention may be constructed in the following manner.

The measurement means measures the abrasion amount of the magnetic head a plurality of times, calculates an average value from the plurality of measurement data obtained by the measurement and determines the average value as measurement data.

The magnetic head is incorporated in a rotary drum, and the measurement means measures the abrasion amount of the magnetic head when a signal is being recorded onto or reproduced from the recording medium with the recording medium wrapped around the rotary drum while the rotary drum is rotating at a predetermined speed of rotation.

In the alternative, the measurement means measures the abrasion amount of the magnetic head when no signal is being recorded onto or reproduced from the recording medium.

According to another alternative, the measurement means automatically measures the abrasion amount of the magnetic head when power supply to the magnetic recording and reproducing apparatus is made available.

As still another alternative, the measurement means automatically measures the abrasion amount of the magnetic head when the magnetic recording and reproducing apparatus ejects the recording medium.

The measurement means measures the abrasion amount of the magnetic head in one mode or a plurality of modes in combination selected from a first mode wherein the measurement means measures the abrasion amount of the magnetic head when a signal is being recorded onto or reproduced from the recording medium with the recording medium wrapped around the rotary drum while the rotary drum is rotating at a predetermined speed of rotation, a second mode wherein the measurement means measures the abrasion amount of the magnetic head when no signal is being recorded onto or reproduced from the recording medium, a third mode wherein the measurement automatically measures the abrasion amount of the magnetic head when power supply to the magnetic recording and reproducing apparatus is made available, and a fourth mode wherein the measurement automatically measures the abrasion amount of the magnetic head when the magnetic recording and reproducing apparatus ejects the recording medium.

With the magnetic recording and reproducing apparatus, the user can visually discriminate the abrasion state or the abrasion amount of the magnetic head and consequently can perform replacement or the like of the magnetic head appropriately. Accordingly, the magnetic recording and reproducing apparatus can eliminate occurrence of an error in recording or reproduction.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a flow chart illustrating calculation processing of a CPU of a system control circuit of the magnetic recording and reproducing apparatus of FIG. 1.

DESCRIPTION OF THE PREFERRED EMBODIMENT

Figure 1:
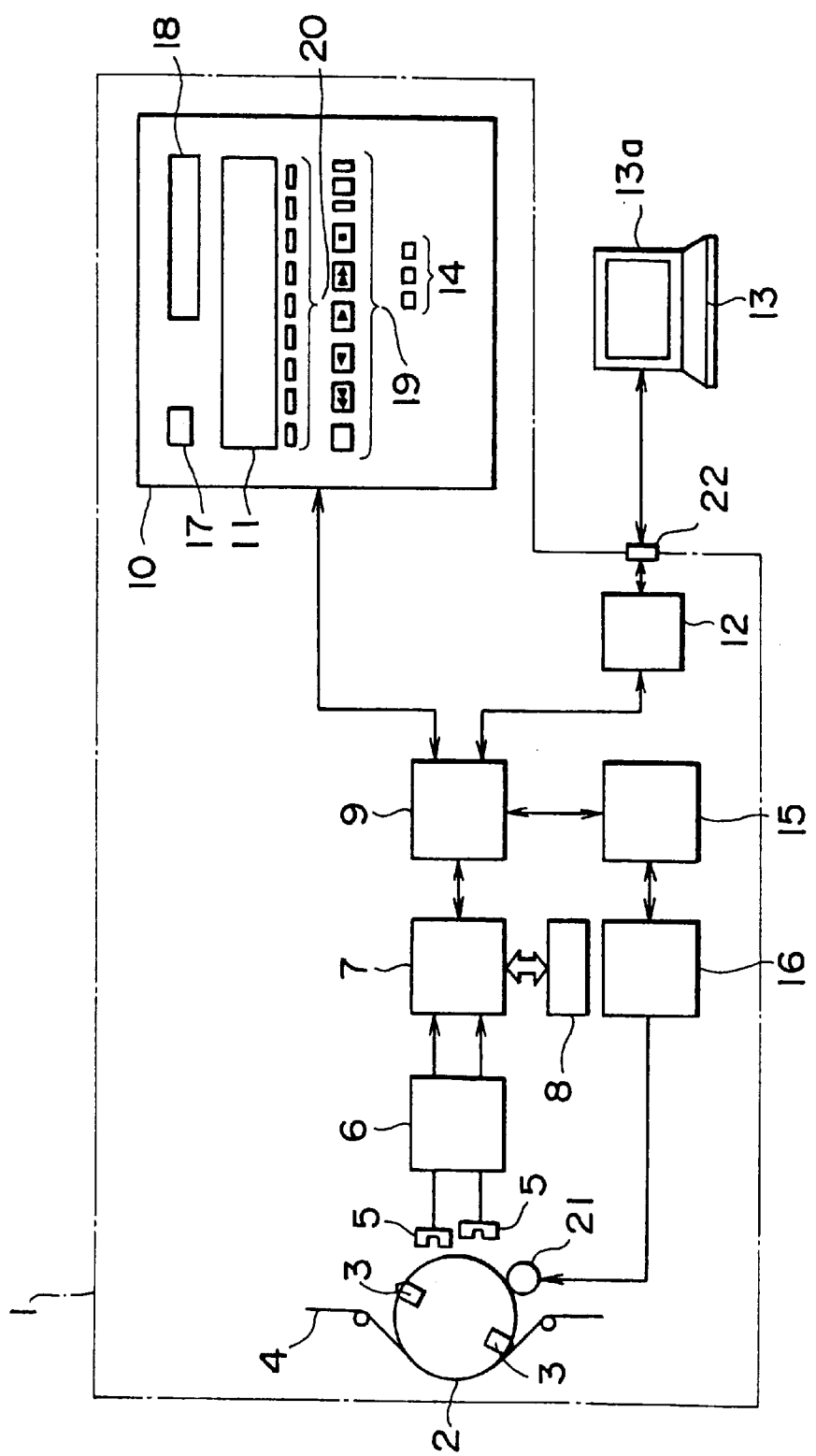
FIG. 1 is a schematic block diagram of a magnetic recording and reproducing apparatus to which the present invention is applied.
Figure 2:
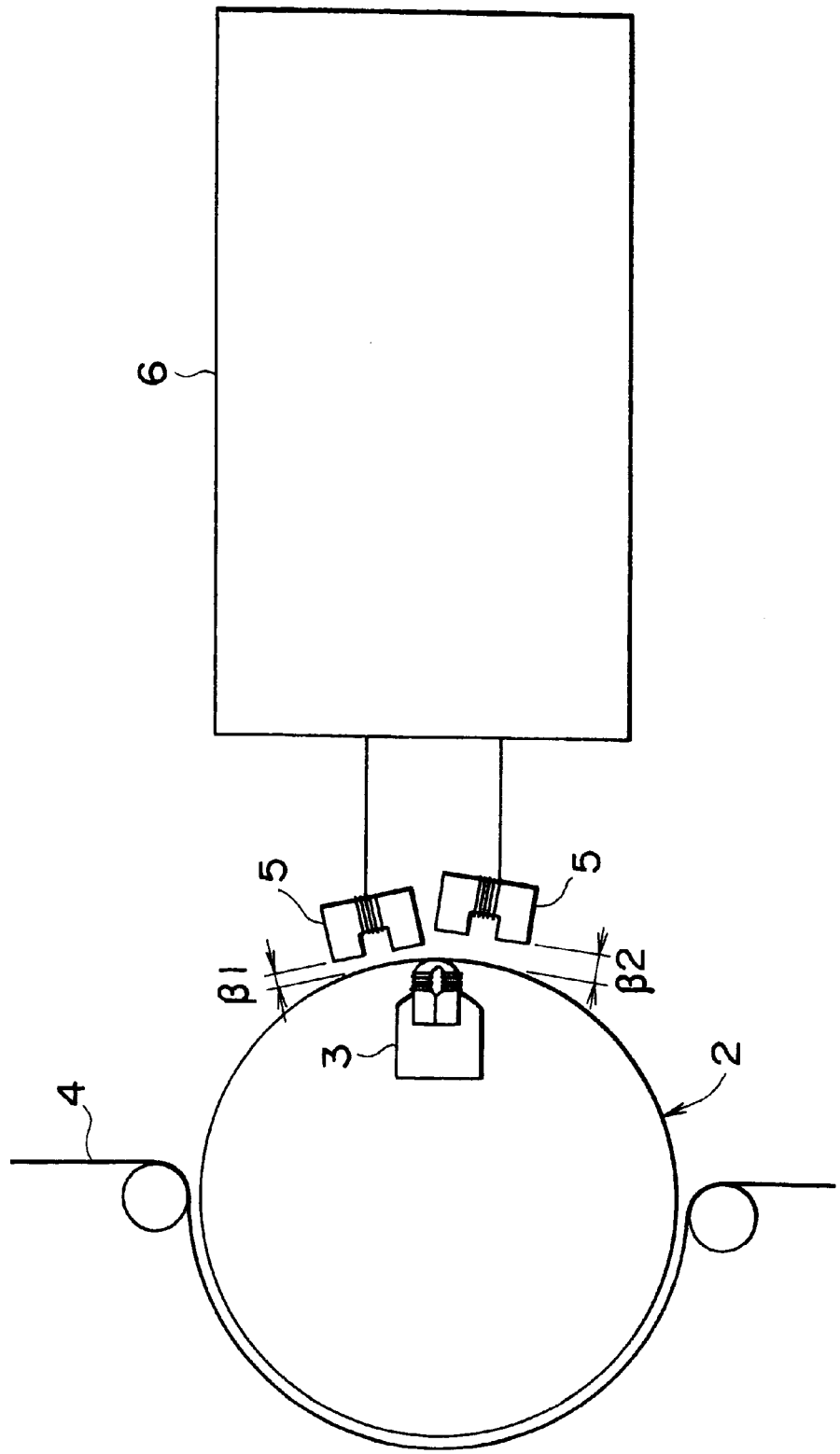
FIG. 2 is a magnetic head abrasion amount measuring instrument employed in the magnetic recording and reproducing apparatus of FIG. 1.

Referring first to FIG. 1, there is shown a schematic block of a magnetic recording and reproducing apparatus to which the present invention is applied. The magnetic recording and reproducing apparatus shown is generally denoted at 1 and includes a rotary drum 2 on which one or a plurality of magnetic heads 3 are mounted. A pair of magnetic sensors 5 for measuring abrasion amounts of the magnetic heads 3 are mounted at positions opposing the magnetic heads 3 outside an angular range within which a magnetic tape 4 is wrapped around the rotary drum 2 such that gaps thereof from ends of the magnetic heads 3 at the positions are different from each other. Here, a variation of the gap between any of the magnetic heads 3 and one of the magnetic sensors 5 which arises from abrasion of the magnetic head 3 is taken as a variation in reluctance, and the variation in reluctance is converted into a variation in inductance (fluctuation in oscillation frequency) to measure the abrasion amount of the magnetic head 3. In order to eliminate an influence of a tolerance in shape or an allowance in mounting of the magnetic head 3, a difference between oscillation frequencies detected from the pair of magnetic sensors 5 is calculated. Since the difference is free from any influence of a dispersion in tolerance in shape of the magnetic head 3 and so forth, if the offset values $\beta 1$ and $\beta 2$ of the two magnetic sensors 5 shown in FIG. 2 are managed with a high degree of accuracy, then the head abrasion amount calculated from the difference exhibits a high degree of accuracy. The magnetic sensors 5 are connected to a measurement circuit 6 which includes an oscillation circuit and a digital measurement circuit (not shown), and the abrasion amount of each of the magnetic heads 3 is digitally measured by the digital measurement circuit of the measurement circuit 6.

Figure 3A:
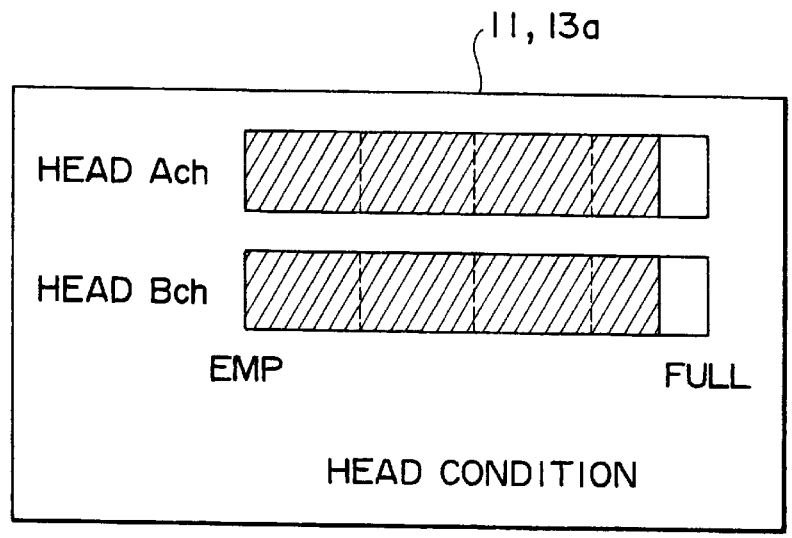
FIGS. 3A, 3B and 3C are schematic views illustrating different displaying manners of the magnetic recording and reproducing apparatus of FIG. 1.
Figure 3B:
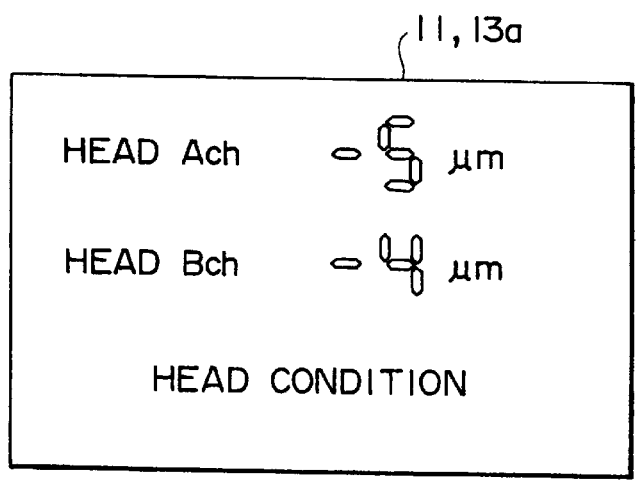
Figure 3C:
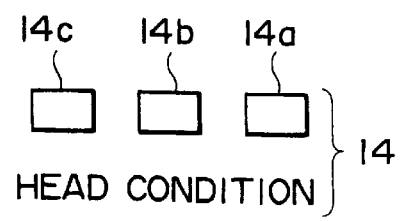

Results of the digital measurement by the measurement circuit 6 are compared with initial values for the magnetic heads 3 stored in a memory 8 by a central processing unit (CPU) 7 so that amounts of variation (abrasion amounts) from the initial values are calculated with a high degree of accuracy. The abrasion amount data of the magnetic heads calculated by the CPU 7 is further processed by a system control circuit 9 and can be selectively displayed on one or a plurality of first display sections 11 disposed on a front panel 10 of the magnetic recording and reproducing apparatus 1. A second display section 14 includes a plurality of light emitting elements disposed on the front panel 10 and a display unit 13a of an externally connectable apparatus 13 such as a personal computer is connected to a connection terminal 22 via an external connection circuit 12. An example a displaying manner of the first display section 11 is shown in FIG. 3A. An abrasion state of each of the magnetic heads 3 is displayed in the form of a bar chart or a scale whose length decreases from an initial value denoted by FULL to a lower limit value denoted by EMP which indicates the effective range of use of the magnetic head 3 with regard to the head depth. In the alternative, an abrasion amount of each of the magnetic heads 3 may be displayed as a concrete numerical value as shown in FIG. 3B. The first display section 11 is, for example, a liquid crystal display unit and can selectively display such information as an allocated situation of operation keys, a feeding direction of a tape and a time code in response to one of mode selection buttons 20 disposed on the front panel 10 below the first display section 11. Further, a plurality of LEDs as light emitting elements are mounted on the front panel 10 as seen in FIG. 3C. For example, three LEDs including a green LED 14a, a yellow LED 14b and a red LED 14c are mounted on the front panel 10, and when one of the magnetic heads 3 is abraded little, the green LED 14a is lit, but when the abrasion of the magnetic head 3 proceeds to a middle degree, the yellow LED 14b is lit. Then, at a time when the magnetic head 3 should be replaced, the red LED 14c is lit or caused to blink to notify the user of the abrasion state of the magnetic head 3.

The abrasion amount of each of the magnetic heads 3 may be measured at four timings. One of the four timings may be selected or two to four of the timings may be selected in combination to perform measurement in accordance with a situation or environment of use of the magnetic recording and reproducing apparatus 1. A measuring mode which is to be used can be set prior to such measurement. Further, in order to determine a measurement value, measurement is preferably performed a value a plurality of times, and a value when the measurement value has stabilized during such measurements the measured value may be determined as an abrasion amount of a magnetic head 3. In the alternative an average value of abrasion amounts obtained by the plurality of measurements may be determined as an abrasion amount of the magnetic head 3.

As the first measurement timing, measurement is performed in a state wherein the rotary drum 2 is rotating at a predetermined speed of rotation with a magnetic tape 4 wrapped around the rotary drum 2. This can occur in a recording or reproduction mode or a fast feeding or rewinding mode which is entered in response to operation of one of operation buttons 19 after a cassette is inserted into a cassette insertion opening 18 disposed on the front panel 10 of the magnetic recording and reproducing apparatus 1. In this instance, the abrasion amount of each of the magnetic heads 3 can be measured for a comparatively long period of time. The abrasion amounts of the magnetic heads 3 thus measured are stored into the memory 8.

As the second measurement timing, measurement is performed in a stand-by state of the magnetic recording and reproducing apparatus 1, that is, in a state wherein the rotary drum 2 is rotating at a fixed speed of rotation with a magnetic tape 4 wrapped around the rotary drum 2. In this state the magnetic tape 4 is not being fed as a result of an operation of one of the operation buttons 19 after a cassette is inserted into the cassette insertion opening 18 disposed on the front panel 10 of the magnetic recording and reproducing apparatus 1. In this instance, since the magnetic tape 4 is not being fed and the magnetic recording and reproducing apparatus 1 is not in a recording or reproducing state, an oscillation frequency of the oscillation circuit included in the measurement circuit 6 does not have an influence on a recording signal or a reproduced signal.

As the third measurement timing, measurement is performed when a power supply switch 17 disposed on the front panel 10 of the magnetic recording and reproducing apparatus 1 is switched on. In this instance, a motor 21 for rotating the rotary drum 2 is controlled by a servo control circuit 15 so that rotary drum 2 may rotate at a predetermined speed of rotation. Here, since no prior operations have been performed by the magnetic recording and reproducing apparatus 1, the load to the CPU in the system control circuit 9 is low and measurement of the abrasion amounts of the magnetic heads 3 can be performed without interrupt.

As the fourth measurement timing, measurement is performed when an eject mode for ejecting a cassette is entered in response to an operation of one of the operation buttons 19 disposed on the front panel 10. In this instance, the motor 21 for rotating the rotary drum 2 is controlled by the servo control circuit 15 so that rotary drum 2 may rotate at a predetermined speed of rotation. Here, since all other operations of the magnetic recording and reproducing apparatus 1 have been completed before then, the load to the CPU in the system control circuit 9 is low and measurement of the abrasion amounts of the magnetic heads 3 can be executed without interrupt.

The measurement of the abrasion amounts of the magnetic heads 3 at any of the measurement timings described above may be performed in one of two modes. The two modes include a first mode wherein the abrasion amounts of the magnetic heads 3 are measured periodically and automatically without any measurement instruction of the user. In the second mode, measurement is performed in response to an operation by the operator of one of the mode selection buttons 20 on the front panel 10 when necessary. In the first mode of measurement wherein the abrasion amounts of the magnetic heads 3 are measured periodically and automatically, every example, measurement is performed for 100 hours of an hours meter (an instrument which stores an accumulated time in which the magnetic recording and reproducing apparatus 1 is used) incorporated in the magnetic recording and reproducing apparatus 1. If the abrasion amounts of the magnetic heads 3 are measured periodically and automatically in this manner, then data of the abrasion amounts of the magnetic heads 3 are periodically and automatically updated and stored into the memory 8. On the other hand, according to the second mode of measurement wherein one of the mode selection buttons 20 of the front panel 10 is operated by the user, the abraded states or the abrasion amounts of the magnetic heads 3 at the point of time of the operation can be discriminated.

In response to the abrasion amounts of the magnetic heads 3 measured in this manner, the servo control circuit 15 or the system control circuit 9 selectively executes a display mode so that the abrasion amounts of the magnetic heads 3 are automatically displayed on the first display section 11 and/or the second display section 14. In the alternative, in response to a control signal from the externally connectable apparatus 13, the abrasion amounts of the magnetic heads 3 are selectively displayed on the first display section 11, the second display section 14 and/or the display unit 13*a*. In accordance with the situation or environment of use of the magnetic recording and reproducing apparatus 1, the abrasion amounts of the magnetic heads 3 may be displayed on only one of the three display elements or on a plurality of the display elements in combination. In the alternative, the second display section 14 may otherwise be controlled so that it normally displays while the power supply to the magnetic recording and reproducing apparatus 1 is on. The apparatus can be preset in which display mode the abrasion amounts of the magnetic heads 3 should be displayed.

In the following, calculation processing of the CPU (Central Processing Unit) in the system control circuit 9 will be described with reference to the flow chart of FIG. 4.

Reading in of a measurement mode is performed in step S1, by reading in one of the measurement modes mentioned above which has been set in advance.

To determine whether the rotary drum is in a locked state in step S2, it is checked whether or not the speed of rotation of the rotary drum 2 has reached a predetermined level and preparations for measurement have been completed.

Reading in of abrasion measurement data is performed in step S3, by performing measurement of the abrasion amounts of the magnetic heads 3.

A discrimination is made in steps S4–S8 of which one of the display modes 0 to 2 has been set. In step S4, one of the display modes described above which has been set in advance is read. In step S5, processing of the measurement data for displaying of the abrasion amounts is performed by the system control circuit 9. In Steps S6–S8, display is performed on one or more of the first display section 11, the second display section 14 and the display unit 13*a* of the externally connectable apparatus 13 of the abrasion amounts of the magnetic heads 3 based on the set display mode. Consequently, the abrasion amounts of the magnetic heads 3 are displayed on one or a plurality of the first display section 11, the second display section 14 and the display unit 13*a* of the externally connectable apparatus 13.

Having now fully described the invention, it will be apparent to one of ordinary skill in the art that many changes and modifications can be made thereto without departing from the spirit and scope of the invention as set forth herein.

What is claimed is:

1. A magnetic recording and reproducing apparatus in which a magnetic head contacts a recording medium to record or reproduce a signal onto or from the recording medium, said apparatus comprising:

measurement means for measuring an abrasion amount of said magnetic head and outputting measurement data;

display means for displaying the abrasion amount of said magnetic head represented by the measurement data outputted from said measurement means; and switch means operable by a user of the apparatus for causing said measurement means to measure said abrasion amount of said magnetic head, wherein said display means selectively displays a first mode wherein the abrasion amount of said magnetic head is displayed by lighting or blinking of a plurality of light emitting diodes, a second mode wherein the abrasion amount of said magnetic head is displayed in a form of a graph having a starting point which represents that said magnetic head is abraded little and an end point representative of a limit of use of said magnetic head, and a third mode wherein the abrasion amount of said magnetic head is displayed in the form of a numerical value.

2. A magnetic recording and reproducing apparatus according to claim 1, wherein said measurement means comprises a magnetic sensor for detecting the abrasion amount of said magnetic head.

3. A magnetic recording and reproducing apparatus according to claim 1, wherein said display means includes a liquid crystal display unit which selectively displays an operation state of said magnetic recording and reproducing apparatus and the abrasion amount of said magnetic head.

4. A magnetic recording and reproducing apparatus according to claim 1, wherein said plurality of light emitting diodes are lit or blink normally when power supply to said magnetic recording and reproducing apparatus is available.

5. A magnetic recording and reproducing apparatus according to claim 1, wherein said measurement means periodically and automatically measures the abrasion amount of said magnetic head based on a time of use of said magnetic recording and reproducing apparatus.

6. A magnetic recording and reproducing apparatus in which a magnetic head contacts a recording medium to record or reproduce a signal onto or from the recording medium, said apparatus comprising:

measurement means for measuring an abrasion amount of said magnetic head and outputting measurement data;

display means for displaying the abrasion amount of said magnetic head represented by the measurement data outputted from said measurement means; and switch means operable by a user of the apparatus for causing said measurement means to measure said abrasion amount of said magnetic head, wherein said measurement means has two modes including a mode wherein said measurement means periodically and automatically measures the abrasion amount of said magnetic head based on a time of use of said magnetic recording and reproducing apparatus, and another mode wherein said measurement means measures the abrasion amount of said magnetic head in response to depression of a button provided on said magnetic recording and reproducing apparatus to cause said measurement means to execute measurement when an operator desires.

7. A magnetic recording and reproducing apparatus according to claim 6, further comprising:

a connection terminal for connecting an externally connectable apparatus to which the measurement data representative of the abrasion amount of said magnetic head outputted from said measurement means is outputted and which includes another display means for displaying the abrasion amount of said magnetic head represented by the measurement data.

8. A magnetic recording and reproducing apparatus according to claim 7, wherein the abrasion amount of said magnetic head represented by the measurement data is displayed on said other display means of the externally connectable apparatus in response to a control signal outputted from the externally connectable apparatus connected to said connection terminal.

9. A magnetic recording and reproducing apparatus according to claim 8, wherein said other display means of the externally connectable apparatus and said display means of said magnetic recording and reproducing apparatus are selectively used in response to a control signal outputted from the externally connectable apparatus connected to said connection terminal.

10. A magnetic recording and reproducing apparatus according to claim 1 or 6, wherein said measurement means measures the abrasion amount of said magnetic head a plurality of times, calculates an average value of a plurality of measurement data obtained by the measurement and determines the average value as measurement data.

11. A magnetic recording and reproducing apparatus according to claim 1 or 6, wherein said magnetic head is incorporated in a rotary drum, and said measurement means measures the abrasion amount of said magnetic head when a signal is being recorded onto or reproduced from the recording medium with the recording medium wrapped around said rotary drum while said rotary drum is rotating at a predetermined speed of rotation.

12. A magnetic recording and reproducing apparatus according to claim 1 or 6, wherein said measurement means measures the abrasion amount of said magnetic head when no signal is being recorded onto or reproduced from the recording medium.

13. A magnetic recording and reproducing apparatus according to claim 1 or 6, wherein said measurement means automatically measures the abrasion amount of said magnetic head when power supply to said magnetic recording and reproducing apparatus is made available.

14. A magnetic recording and reproducing apparatus according to claim 1 or 6, wherein said measurement means automatically measures the abrasion of said magnetic head when said magnetic recording and reproducing apparatus ejects the recording medium.

* * * * *